Feb. 13, 1973 L. G. SIMJIAN 3,716,698
CONTROL AND RECORDING APPARATUS
Filed Sept. 2, 1971 4 Sheets-Sheet 1
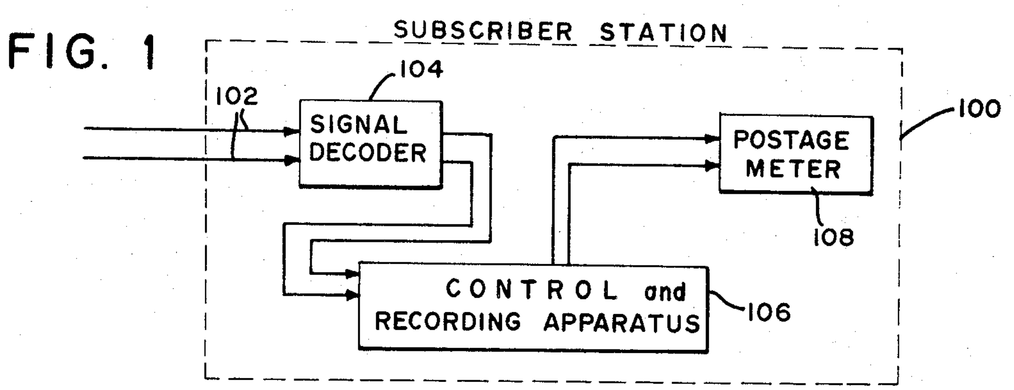
FIG. 2
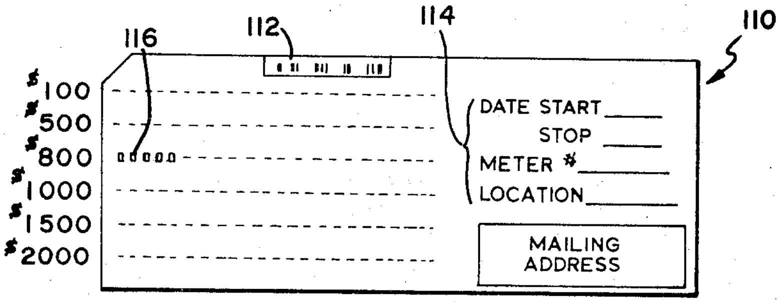
FIG. 3
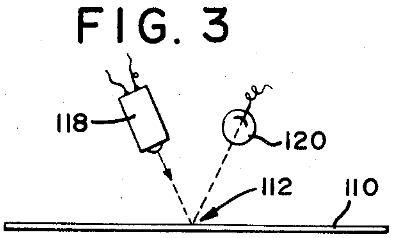
FIG. 4
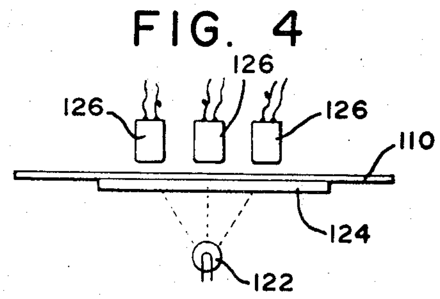
FIG. 5
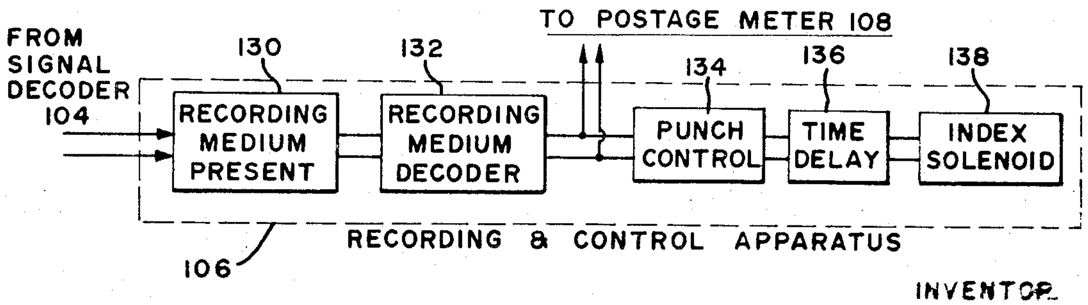
INVENTOR
LUTHER G. SIMJIAN
BY:
Ervin B. Steinberg INVENTOR.
LUTHER G. SIMJIAN
BY:
Ervin B. Steinberg Feb. 13, 1973 L. G. SIMJIAN 3,716,698

CONTROL AND RECORDING APPARATUS

Filed Sept. 2, 1971 4 Sheets-Sheet 3

INVENTOR.
LUTHER G. SIMJIAN
BY:
Ervin B. Steinberg

CONTROL AND RECORDING APPARATUS

Filed Sept. 2, 1971 4 Sheets-Sheet 4

INVENTOR.
LUTHER G. SIMJIAN

BY:

Ervin B. Steinberg

United States Patent Office 3,716,698

Patented Feb. 13, 1973

3,716,698

CONTROL AND RECORDING APPARATUS

Luther G. Simjian, Greenwich, Conn., assignor to General Research, Inc., Greenwich, Conn.

Filed Sept. 2, 1971, Ser. No. 177,316
Int. Cl. G06k *1/02;* H04q *1/00*
U.S. Cl. 235—61.1 17 Claims

ABSTRACT OF THE DISCLOSURE

A control and recording apparatus operable in conjunction with a remotely controlled instrumentality includes a removable recording medium adapted to record the arrival of a signal which controls such instrumentality. Means are provided to sense that the medium is of proper character and present in predetermined position. In the absence of a medium or if it is not of the proper character operation of the instrumentality is blocked. The apparatus includes resetting means which become operable upon the removal of the recording medium from the apparatus.

The present invention concerns a control and recording apparatus adapted to operate in conjunction with an apparatus which is subject to a remotely initiated control signal. More specifically, the present invention refers to a control and recording apparatus suitable for operation in conjunction a postage meter or similar instrumentality which is actuated or released for operation by a signal, such as a credit validation signal or the like, provided from a remote station.

Quite specifically, this invention concerns a control and recording apparatus which is designed for operation in conjunction with a postage metering system device disclosed in my previously issued Pat. No. 3,501,744 dated Mar. 17, 1970 entitled, "Postage Metering System Having Signal Conditioning Means," which disclosure is specifically incorporated in this specification.

In the above referenced patent I have disclosed a postage metering system which includes a postage meter disposed at a subscriber or user location which is provided with settable means for enabling the subscriber or user to set the credit register of the meter to an amount which reflects a new credit balance. The settable means is normally in an inoperative condition, but is rendered operative for setting the register to reflect a predetermined increment in response to the receipt of a coded electrical signal originating at a remote central station. The present apparatus adapted to operate in conjunction with a postage meter of this type includes means for providing documentary evidence of the quantity of credit release signals received or the number of settings made reflecting an increased credit balance of the credit register, the amount of the credit increase, and, moreover, includes additional means to render the postage meter inoperative in the absence of means which provides such documentary evidence.

One of the principal objects of this invention is, therefore, the provision of a new and improved control and recording apparatus.

Another important object of this invention is the provision of a control and recording apparatus adapted to operate specifically in conjunction with a postage meter or similar instrumentality, such as a device of the character described heretofore.

A further important object of this invention is the provision of a control and recording apparatus for providing documentary evidence with respect to the quantity of release signals transmitted and received by a postage meter or similar instrumentality and the character of such signals.

A still further object of this invention is the provision of a control and recording apparatus adapted to provide documentary evidence with regard to received signals and including means to block the operation of a principal apparatus controlled by such control and recording apparatus in the absence of a predetermined record receiving instrumentality.

Further and still other objects of this invention will be more clearly apparent by reference to the following description when taken in conjunction with the accompanying drawings in which:

FIG. 1 is a block diagram of the general arrangement which includes the control and recording means together with the postage meter or similar instrumentality controlled by the control and recording apparatus;

FIG. 2 is a plan view of a typical recording medium usable in conjunction with the control and recording apparatus;

FIG. 3 is a schematic illustration disclosing typical sensing means usable for determining whether the recording medium is of the proper character;

FIG. 4 is a schematic illustration showing a variation of the arrangement shown in FIG. 3;

FIG. 5 is a block diagram showing the signal flow for causing operation of the control and recording apparatus;

Figure 6:
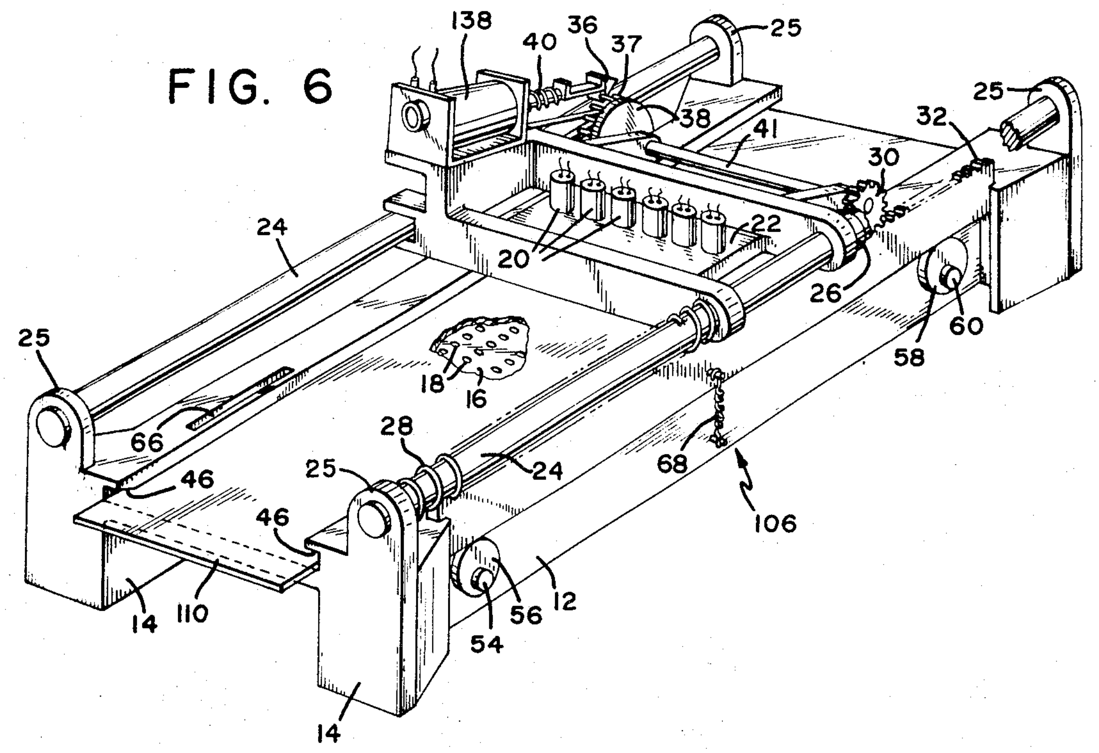
FIG. 6 is a perspective view of a typical and preferred embodiment of the control and recording apparatus in accordance with the present disclosure.
Figure 7:
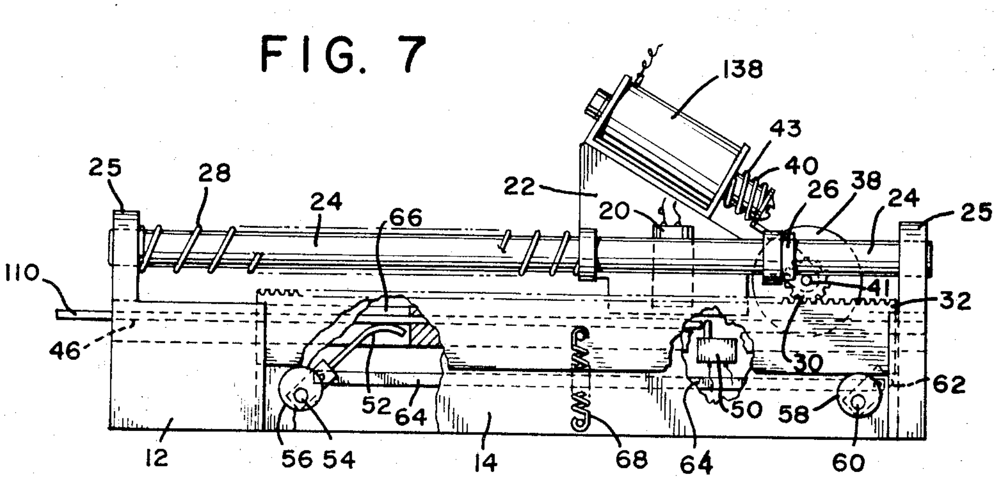
FIG. 7 is a side, elevational view of the apparatus shown in FIG. 6.

Referring now to the figures and FIG. 1 in particular, numeral 100 identifies the subscriber station which is identified by numeral 12 in the above referenced U.S. patent. The subscriber station 100 receives along conductors 102 a coded electrical signal which is fed to a signal decoder 104 which checks that the signal is of the appropriate character and is transmitted to the proper subscriber station. From the signal decoder 104 the signal is fed to a control and recording apparatus 106 which is adapted to record the receipt of a signal and if the apparatus 106 is provided with a recording medium upon which the receipt of a signal is recorded the postage meter 108 is released for operation, or in the absence of a suitable recording medium in the control and recording apparatus 106 the postage meter 108 or similar instrumentality is inhibited from operation.

As seen in FIG. 2, a typical recording medium 110 is shown which in this instance is a tabulating card. It will be apparent and should be understood that a strip chart, a magnetic recording medium or other suitable means adapted to provide documentary evidence may be used without departing from the concept of the present invention. As seen in FIG. 2, the particular recording medium preferably has a code block area 112 to serve for the purpose of ensuring that the recording medium is of the prescribed character, that is, an approved recording medium or alternatively it may be coded with respect to a specific subscriber station, or a specific postage meter 108, see FIG. 1. Additionally, the recording medium is provided with information such as the starting date, the stopping date, the meter number, location, mailing address, etc. and such other information which is either imprinted in advance or is to be supplied locally in order to aid in performing a subsequent audit and tracing the location of the recording medium. The recording medium is divided into a plurality of positions and columns as is conventional practice in connection with tabulating cards. When the recording medium is disposed in the control apparatus, the receipt of a credit release signal causes a specific punch mark, such as the punch mark 116, which indicates a second credit release signal of $800.00. Subsequent punch marks indicate the subsequent arrival of credit release signals and the position of each punch mark indicates the amount of the released credit. For instance, in the example shown there are six positions indicative of $100, $500, $800, $1,000, $1,500 or $2,000 respectively. It should be understood, however, that these values are strictly arbitrary and may be adjusted to suit the particular conditions. It will be appreciated that instead of punch marks, pencil or ink marks, burn marks or magnetic indicia may be used without depending from the scope of the invention.

FIGS. 3 and 4 indicate schematically means for sensing the code contained within the code block 112 of the recording medium 110. Both in FIGS. 3 and 4 the code is assumed to comprise light responsive indicia, such as opaque and transparent areas or fluorescent spots and the like as is well known in the art of encoding documents. In FIG. 3 illuminating means 118 are used in conjunction with light responsive means 120. The coding may be fluorescent ink spots which are invisible to a naked eye but become visible when excited wtih a special light source 118. In FIG. 4 the recording medium 110 is disposed between a source of light 122, a diffusion plate 124 and light responsive sensing cells 126 to sense a predetermined pattern of code indicia. A typical document authenticating arrangement of this type is shown in my previous U.S. Pat. No. 2,941,187 issued June 14, 1960.

FIG. 5 indicates the flow of signals when the recording and control apparatus 106 is used in conjunction with the postage meter 108. The signal from the signal decoder 104 first reaches a sensing means 130 to determine whether a recording medium, such as the card 110, is present in the recording and control apparatus. If none is present, further operation of the subsequent mechanisms is inhibited. Thereafter the signal reaches the recording decoding means 132, a device of the type indicated in FIGS. 3 and 4, to determine whether or not the recording medium is of the proper and prescribed type. If the signals from the blocks 130 and 132 are affirmative the postage meter 108 is rendered operative, that is, the mechanism which permits setting the meter to represent an increased credit balance is released from its blocked position. Also a punch control mechanism 134 is actuated which controls one of a plurality of solenoid operated punches for providing a suitable mark 116, FIG. 2, on the recording medium 110. A time delay circuit 136 permits the punch control circuit 134 to go through its operational cycle before an indexing solenoid 138 is actuated to shift the recording medium relative to the marking device so as to provide incremental spacing between successive markings.

It should be noted here that punch control mechanisms 134 and time delay circuits 136 are well known in the art and are not described in detail hereafter.

Figure 10:
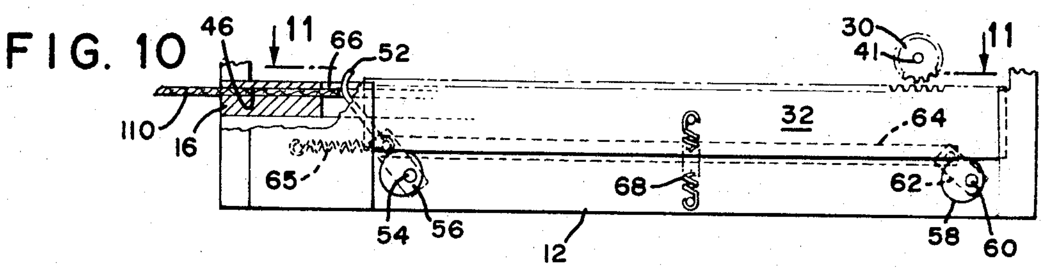
FIG. 10 is a partial side elevational view showing certain details, particularly a rack and pinion arrangement.
Figures 11, 12:
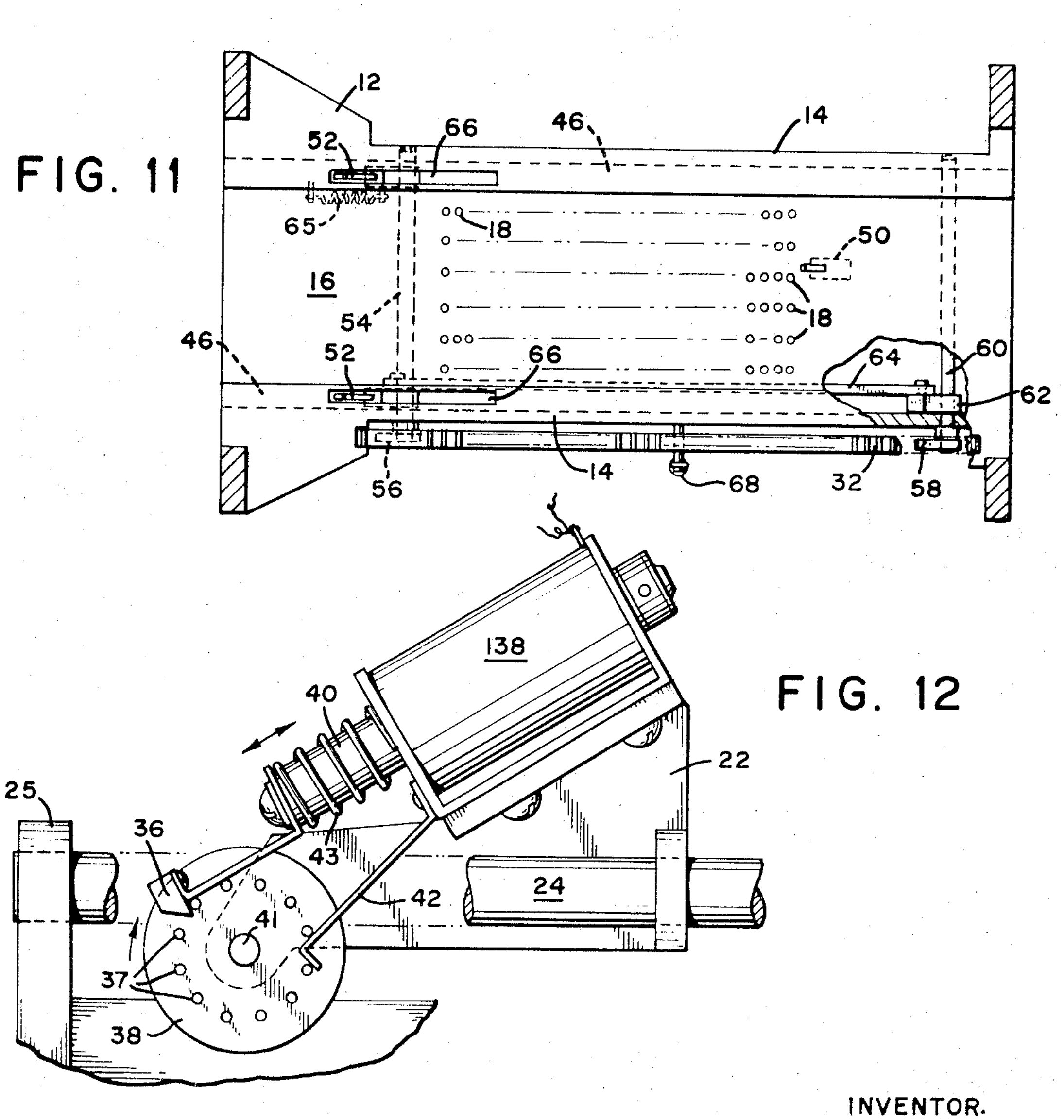
FIG. 11 is a view taken along line 11—11 of FIG. 10.
FIG. 12 is a side elevational enlarged view of a ratchet mechanism taken substantially along line 12—12 of FIG. 8.

A typical mechanical embodiment of the recording and control apparatus is indicated with reference to FIGS. 6 through 12. The apparatus 106 comprises essentially a support means for the recording medium 110 and for this purpose includes a cast body 12, FIGS. 6 through 9, having two longitudinal side pieces 14 which are connected by a horizontal bridge 16. A plurality of dies 18 are arranged along six spaced rows which run longitudinally in the bridge portion 16 of the body 12 as best seen in FIG. 11. It will be apparent that the location of the dies must coincide with the pattern of the marking locations indicated in FIG. 2. A plurality of transversely disposed punches 20, FIG. 6, located above the dies cooperate with the dies as is necessary in order to provide the appropriate punch marks in the recording medium. It will be apparent, moreover, that for each row of dies there is one punch provided which is mounted to be indexed along the row in step by step fashion for providing the incremental spacing between successive marks. The quantity of punches 20 and die positions can be adjusted to the desired conditions and as seen with reference to FIG. 2, in the present instance six dies are provided to represent the preselected amounts of money described in FIG. 2. If more convenient, a single punch can be provided in which case the postage meter will receive a predetermined amount of money which remains substantially unaltered unless the punch is repositioned. Alternatively, a plurality of punches can be provided while only one punch, representing the selected amount, is connected for receiving the signal for providing the punch mark. Alternatively, a plurality of punchs can be connected to a selector switch, not shown, and an authorized service man sets the switch to the appropriate punch connection which is to be operated upon the receipt of a signal. Still further, the incoming signal may be coded according to the amount of credit and the appropriate punch or punches are actuated to represent in combination the value of the credit signal transmitted. The punches 20 are mounted upon a movable carriage 22 which is supported for translating motion along two spaced substantially parallel rods 24 which are supported in ears 25 on the body 12.

Figure 8:
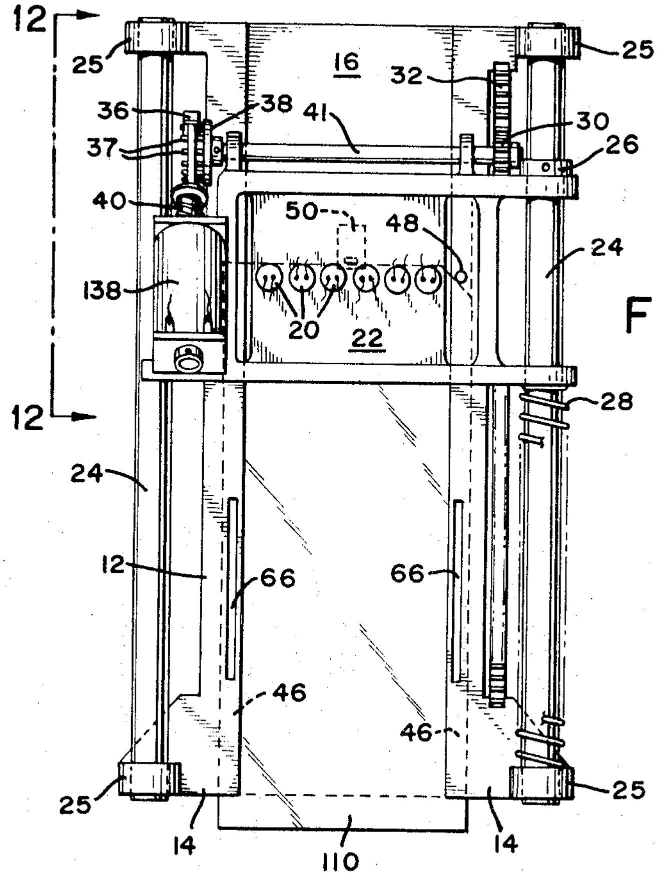
FIG. 8 is a top plan view of the same.
Figure 9:
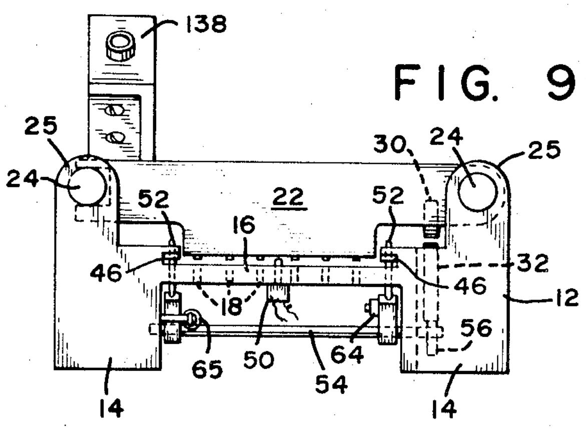
FIG. 9 is an end elevational view of the apparatus.

The carriage 22 is biased toward its normal or zero position against a mechanical stop 26, see FIG. 8, by a helical compression spring 28 surrounding a portion of one rod 24 and pressing against the carriage. Translating motion of the carriage 22 is accomplished by a driven pinion 30, FIG. 6, on the carriage 22 engaging a stationary rack 32. An electrically controlled solenoid 138, also mounted upon the carriage, furnishes the power for rotating the pinion 30. This indexing motion is provided by the coaction of a pawl 36 and a plurality of pins 37, see FIG. 12, extending from a side of wheel 38 in the manner of a ratchet wheel. The pawl 36 is secured to the end of a plunger rod 40 of the solenoid 138 to undergo reciprocating motion, and the wheel 38 is secured to the shaft 41 for driving the pinion 30 fixed upon the opposite end of the shaft 41, see FIGS. 6 and 8.

It is important to observe that all of these driving components are so arranged that each time the solenoid 138 is energized for undergoing one cycle of operation, each of the punches 20 is moved from one cooperative position above a die 18 in the respective row into a cooperative position above the next adjacent die in the row. This spacing corresponds to the columnar spacing of the medium 110. In other words, the solenoid 138 provides an indexing motion of the solenoids for causing incremental spacing of the marking means with respect to the recording medium 110 which, in this example, remains stationary.

A locking arm 42, FIG. 12, engages at least one of the pins 37 in such a manner as to ensure retention of the punches in position above a die by preventing counterrotation of the wheel 38 which would cause a loss of register. A spring 43, FIG. 12, returns the plunger 40 to its normal position ready for the next electrical pulse which causes a further incremental displacement of the punch or punches along the recording medium.

When a recording medium 110 is inserted in the channels 46 against a stop pin 48, see FIG. 8, a sensing means 130, FIG. 5, such as a mechanically operated electrical switching means 50, is operated to signify that the recording medium is present in its predetermined position. It will be noted that without a recording medium 110 in place on the carriage, the rack 32 is disengaged from the pinion 30, FIG. 10, and any electrical impulse on the solenoid 34 will have no effect upon the moving carriage. Upon insertion, the recording medium 110 pushes against a pair of fingers 52 normally protruding into the path of the recording medium as best seen in FIG. 10. The medium 110 pushes the fingers 52 out of its path, thus rotating them clockwise about a shaft 54 on which these fingers 52 are mounted, see FIG. 7. A cam 56 mounted upon the shaft 54 and acting against the underside of the rack 32 is thus rotated, raising the rack 32 into engagement with the pionion 30, readiy for driving the carriage. In order to provide level and balanced elevation of the rack 32, a second cam 58 is mounted on a shaft 60 to co-act at the opposite end of the rack. Coincident operation of the second cam 58 is accomplished by a crank 62 on the shaft 60 through a connecting rod 64 attached to the fingers 52. The channels 46 are provided with suitable slots 66 to permit angular movement of the fingers 52. When the recording medium 110 is removed, it will become apparent that, due to the tension of a spring 65, the fingers 52 will be returned to their normally raised position, FIG. 10, and thus the rack 32 becomes disengaged from the pinion 30 on account of the movement of the cams 56 and 58 and with the bias of a further spring 68.

In operation, a recording medium, such as a card 110, is inserted in the channels 46 and moved against the fingers 52, thus rotating the cams 56 and 58 and raising the rack 32 into meshing contact with the pionion 30. The card 110 is then pushed further against the stop 48, causing operation of the sensing switch 50 denoting that the recording medium is in predetermined position. The record decoding means 132, FIG. 5, may be actuated also, but for the sake of simplicity its position and components have been omitted from the representation in FIGS. 6 through 12. Upon the receipt of an electrical signal from the remote station and from the signal decoder 104, FIG. 5, the punch control means 134 is actuated which selectively actuates one or a combination of punches 20 to mark the recording medium with the appropriate mark. After a short time delay as governed by the time delay circuit 136 the solenoid 138 is actuated for indexing the punch or punches incrementally to the next space in order to provide an indication of a succeeding credit signal.

The recording means can be left in place for a predetermined time period or billing period, such as a month, and then can be removed by an attendant and transmitted to a central authority for audit purposes. This may include the completing of the required data indicated by numeral 114 in FIG. 2. Upon removal of the card from the apparatus 106, the rack 32 is disengaged from the pinion 30 as described above and the spring 28 returns the carriage against the stop 26, the normal or zero position. However, until a new recording medium 110 is in place and the sensing means 130 is actuated and the decoding means 132 has established the validity of the recording medium, operation of the postage meter or similar instrumentality remains inhibited. Upon providing a new recording medium and inserting it in the present apparatus, the foregoing steps can be repeated.

In an alternative embodiment, instead of using the electrical signal representing a credit release from the central station for causing immediate actuation of the marking means, it will readily be possible to defer such marking until such time that the credit register is reset mechanically to reflect the increased credit as shown in the heretofore identified U.S. patent. In other words, the receipt of an electrical signal and the presence of the appropriate recording medium in the recording and control apparatus releases the locked mechanism in the postage meter so that the credit register in the postage meter can be reset to reflect a new credit balance and when the register is actually reset this resetting operation simultaneously causes the marking of the recording medium and operation of the indexing mechanism described heretofore. If mechanical connection is established between the postage meter and the present apparatus, the marking means may be actuated mechanically rather than electrically.

Upon removal of the recording medium and transmittal of the recording medium to a central authority, the recording medium, if marked in accordance with standard technology, can be fed through computerized systems, tabulated and summarized for audit purposes and the quantity of credit signals or credit adjustments made at the subscriber station can be compared with the record maintained at the central station. In this manner a steady and continuing surveillance becomes readily available in a most convenient manner.

A further alternative embodiment comprises a reversal of parts, specifically moving the recording medium relative to the marking device. In this case the recording medium on a support is translated relative to a stationary punch position. It will be readily understood that such a reversal is clearly within the skill of the art and comprehended by this disclosure.

While the present invention has been described for use primarily in conjunction with a postage meter apparatus disclosed heretofore, it will be apparent that the present apparatus has use in combination with many other devices wherein a documentary record of the quantity of incoming signals and the nature thereof is to be made.

What is claimed is:

1. A control and recording apparatus adapted to operate in conjunction with a postage meter or similar instrumentality comprising:

support means for supporting a removable recording medium;

marking means disposed for affixing a marking upon said recording medium responsive to the receipt of an electrical signal by said apparatus;

indexing means coacting between said marking means and said recording medium for causing said marking means to affix markings at incremental spaces on said recording medium responsive to the receipt of successive electrical signals by said apparatus;

normalizing means for resetting said indexing means to a predetermined start position responsive to the removal of said recording medium from said support means; and control means coacting with said apparatus for inhibiting operation of another instrumentality and of said marking means in the absence of a recording medium being in predetermined position on said support means, and for rendering such instrumentality and said marking means operative responsive to the presence of a recording medium being in predetermined position on said support means.

2. A control and recording means apparatus as set forth in claim 1, and including sensing means disposed for sensing a predetermined code on said medium when said medium is disposed in said predetermined position, said sensing means being coupled in circuit with said control means for rendering the instrumentality and said marking means operative responsive to said medium being provided with a predetermined code as sensed by said sensing means and said medium being in said predetermined position.

3. A control and recording apparatus as set forth in claim 2, said sensing means for sensing a predetermined code on said medium comprising light responsive means.

4. A control and recording apparatus as set forth in claim 2, said recording medium being a card.

5. A control and recording apparatus as set forth in claim 2, said marking means comprising a punch for providing when actuated said medium with a punch mark.

6. A control and recording apparatus as set forth in claim 2, said support means including a first means for supporting said medium in predetermined stationary position; a second means supporting said marking means; said indexing means incrementally displacing said second means relative to said first means responsive to the receipt of successive electrical signals, and said normalizing means adapted to reset said second means to its original not displaced position responsive to the removal of said recording medium from said support means.

7. A control and recording apparatus as set forth in claim 6, said indexing means including an intermittently operated electrical device acting upon said second means, and said normalizing means including resilient means and a mechanical stop coacting between said first and said second means for effecting resetting of said second means.

8. A control and recording apparatus as set forth in claim 2, and means coupled to said marking means and said indexing means for causing the time-spaced sequential operation of said marking and indexing means.

9. A control and recording apparatus as set forth in claim 8, said means coupled to said marking means and said indexing means being coupled in circuit with time delay means for causing the sequential operation of said marking means and said indexing means.

10. A control and recording apparatus as set forth in claim 2, said marking means comprising a plurality of selectively operable such means, each marking means adapted to affix a mark upon a respective indicia position on said medium, and such position being indicative of predetermined information subject to analysis.

11. A control and recording apparatus as set forth in claim 2, said support means including a first substantially flat means for supporting said medium in the form of a card in substantially plane position; a second means supporting said marking means in position for affixing when actuated a mark upon said medium; said indexing means including rack and pinion means coupled between said first and second means and a solenoid coupled for causing operation of said pinion whereby to effect incremental displacement of said second means relative to said first means, and said normalizing means including resilient means and a stop means for urging said second means against said stop means when said medium is removed from said first means.

12. A control and recording apparatus as set forth in claim 2, said control means including switching means for sensing the condition when a recording medium is disposed in predetermined position on said support means.

13. A control and recording apparatus comprising:

support means for supporting a removable code bearing recording medium in the form of a card;

means for sensing the condition when said medium is in predetermined position on said support means;

means for authenticating the medium disposed for coacting with said code when the medium is in said predetermined position;

marking means disposed to provide indicia upon said medium in response to an electrical signal condition;

means coupling said marking means for being responsive to said electrical signal condition;

indexing means which include rack and pinion means and a motion imparting device coupled to said pinion disposed in cooperative relationship between said marking means and said support means for causing said marking means to provide indicia at incremental spaces on said medium responsive to the existence of successive such electrical signal conditions;

normalizing means which include a mechanical stop means and biasing means coupled for causing a resetting of said indexing means to a predetermined position responsive to the removal of said medium from said support means; and control means coupled in circuit with said marking means, said means for authenticating, said indexing means and another instrumentality for inhibiting operation of such instrumentality, said indexing means and said marking means in the absence of a recording medium being in said predetermined position on said support means or said code being not authenticated by said means for authenticating.

14. A control and recording apparatus as set forth in claim 13, said marking means being mounted upon a movable carriage, said indexing means causing incremental translating motion of said carriage relative to said support means; said stop means providing a stop for said carriage motion in one direction, and said biassing means urging said carriage toward said stop means.

15. A control and recording apparatus as set forth in claim 14, and including rotatable cam means assuming a position responsive to the condition of said medium on said support means for causing a disengagement of said rack and pinion means in the absence of said medium being disposed on said support means, such absence causing said biassing means to effect a resetting of said carriage against said stop means if displaced therefrom.

16. A control and recording apparatus as set forth in claim 15, and movable finger means disposed in the path of disposing said medium on said support means whereby said medium when being placed upon said support means operates said finger means, and said finger means being coupled to said cam means to cause concomittant motion of said cam means.

17. A control and recording apparatus as set forth in claim 16, and including spring biassing means effective upon said cam and finger means for urging said finger means to assume said position in the path of disposing said medium on said support means.

References Cited

UNITED STATES PATENTS

| | | | |
|---|---|---|---|
| 3,184,714 | 5/1965 | Brown, Jr. et al. | 235—61.7 B |
| 3,457,391 | 7/1969 | Mititaka Yamamoto | 235—61.7 B |
| 3,469,240 | 9/1969 | Ryden | 235—61.7 B |
| 3,559,175 | 1/1971 | Pomeroy | 235—61.7 B |

DARYL W. COOK, Primary Examiner

U.S. Cl. X.R.

340—149 R